United States Patent [19]

Fukuda et al.

[11] Patent Number: 5,082,596

[45] Date of Patent: Jan. 21, 1992

[54] ELECTROCONDUCTIVE SILICONE RUBBER COMPOSITION AND CURED SILICONE RUBBER ARTICLE THEREOF

[75] Inventors: Takeshi Fukuda; Kunihiko Mita, both of Annaka, Japan

[73] Assignee: Shin-Etsu Chemical Co., Ltd., Tokyo, Japan

[21] Appl. No.: 416,379

[22] Filed: Oct. 3, 1989

[30] Foreign Application Priority Data

Oct. 11, 1988 [JP] Japan .............................. 63-255561

[51] Int. Cl.$^5$ .............................................. H01B 1/06
[52] U.S. Cl. ..................................... 252/511; 524/588
[58] Field of Search ............... 252/511; 524/495, 496, 524/588; 428/331, 332, 339

[56] References Cited

U.S. PATENT DOCUMENTS

| | | | |
|---|---|---|---|
| 4,273,697 | 6/1981 | Sumimura et al. | 252/511 |
| 4,777,205 | 10/1988 | LaScala et al. | 252/511 |
| 4,956,203 | 9/1990 | Kroupa | 252/511 |
| 5,015,413 | 5/1991 | Nagoaka | 252/511 |

*Primary Examiner*—Josephine Barr
*Attorney, Agent, or Firm*—Wyatt, Gerger, Burke and Badie

[57] ABSTRACT

An electroconductive silicone rubber having a high electroconductivity and retaining the good workability in compounding and molding and excellent properties inherent in silicone rubbers in general can be obtained by compounding a curable organopolysiloxane composition comprising a gum-like diorganopolysiloxane, carbon black as a conductivity-imparting agent and a curing agent with a cured silicone rubber powder of spherical particle configuration having specified particle diameter and specified sphericity which partially replaces the diorganopolysiloxane gum.

4 Claims, No Drawings

ELECTROCONDUCTIVE SILICONE RUBBER COMPOSITION AND CURED SILICONE RUBBER ARTICLE THEREOF

BACKGROUND OF THE INVENTION

The present invention relates to an electroconductive silicone rubber composition or, more particularly, to an electroconductive silicone rubber composition having excellent moldability and curing behavior and capable of giving an electroconductive cured silicone rubber article having a relatively low hardness and still excellent rubbery properties and high electroconductivity. The invention relates also to an electroconductive cured silicone rubber article obtained by curing the composition.

It is widely known in the prior art that an electroconductive rubber composition can be obtained by compounding an insulating rubber composition with a substantial volume of a finely divided electroconductive material such as metal powders and carbon blacks and various types of electroconductive rubber compositions are under practical use. For example, a volume resistivity of $10^5$ to $10^1$ ohm.cm can be easily obtained by compounding an insulating rubber composition with carbon black.

Silicone rubbers as a class of insulating rubber compositions having excellent heat and cold resistance and weatherability can also be imparted with electroconductivity by compounding with a finely divided electroconductive material. Several grades of electroconductive silicone rubber compositions are available on the market and widely used in practice.

The finely divided electroconductive materials conventionally compounded in an electroconductive silicone rubber composition include carbonaceous powders such as carbon blacks and graphite powders, powders of a metal such as silver, nickel, copper and the like, carbon fibers, metal fibers and non-electroconductive particles and fibers plated with a metal on the surface. Silicone rubber compositions compounded with these electroconductive materials can be imparted with a decreased volume resistivity of $10^{10}$ to $10^{-3}$ ohm.cm depending on the type of the electroconductive material and the amount of loading thereof with substantially no adverse influences on the unique properties inherent in silicone rubbers. A highly electroconductive silicone rubber having a volume resistivity of $10^5$ ohm.cm or below can be obtained by using a large volume of carbon black or a powder of a metal such as silver, nickel and the like.

When a highly electroconductive silicone rubber having a volume resistivity of 5 ohm.cm or below is desired by using a carbon black such as acetylene black, the amount of the carbon black compounded in the silicone rubber composition must be increased so greatly that the silicone rubber composition is poorly workable in roll milling and molding and the cured silicone rubber articles thereof may be poor in the rubbery elasticity or have an excessively high hardness to impart brittleness to the rubber. Moreover, it is known that carbon blacks have an adverse influence on the curing behavior of silicone rubbers due to the surface properties of the carbon particles and impurities contained therein. This is the reason for the difficulties in obtaining a highly electroconductive silicone rubber having excellent mechanical properties by using a carbon black as the conductivity-imparting particulate material.

Japanese Patent Kokai 61-108661 discloses an electroconductive silicone rubber composition containing carbon black as the conductivity-imparting material and compounded with a powder obtained by crushing and pulverizing a cured silicone rubber. This electroconductive silicone rubber composition compounded with a powder of cured silicone rubber is indeed advantageous in obtaining a moderate hardness of the cured silicone rubber body even by increasing the amount of compounded carbon black and reproducibility of the electric conductivity of the cured silicone rubber articles thereof. The improvement obtained by this means, however, is still insufficient and no solution is given thereby of the problem of the poor workability and curing behavior of electroconductive silicone rubber composition.

SUMMARY OF THE INVENTION

The present invention accordingly has an object to provide an electroconductive silicone rubber composition having excellent workability in roll milling and molding and good curing behavior and capable of giving a highly electroconductive cured silicone rubber article having a relatively low hardness and excellent rubbery elasticity.

Thus, the electroconductive silicone rubber composition of the present invention comprises, as a uniform blend:

(a) a diorganopolysiloxane represented by the average unit formula

$$R_n SiO_{(4-n)/2}, \qquad (I)$$

in which R is a substituted or unsubstituted monovalent hydrocarbon group and the subscript n is a positive number in the range from 1.95 to 2.05;

(b) a cured silicone rubber in the form of a powder of which the particles have a spherical configuration with a sphericity of 0.8 to 1 and an average particle diameter in the range from 0.1 to 100 μm;

(c) carbon black in an amount sufficient to impart electroconductivity to the composition; and (d) a curing agent, the proportion of the component (a) to component (b) being in the range from 95:5 to 50:50 by weight.

DETAILED DESCRIPTION OF THE PREFERRED EMBODIMENTS

As is described above, the inventive electroconductive silicone rubber composition comprises, as the essential ingredients, the components (a) to (d), of which the components (a) and (b) are the organopolysiloxane ingredients. The most characteristic ingredient in the inventive composition is the component (b).

The component (a) is a diorganopolysiloxane having a gum-like consistency and represented by the average unit formula (I) given above. In the formula, the subscript n is a positive number in the range from 1.95 to 2.05 indicating that the diorganopolysiloxane has a substantially linear molecular structure. The symbol R in the formula (I) denotes a substituted or unsubstituted monovalent hydrocarbon group exemplified by alkyl groups such as methyl, ethyl and propyl groups, cycloalkyl groups such as cyclopentyl and cyclohexyl groups, alkenyl groups such as vinyl and allyl groups and aryl groups such as phenyl and tolyl groups as well as those substituted hydrocarbon groups obtained by replacing a part or all of the hydrogen atoms in the above named hydrocarbon groups with halogen atoms, cyano groups and the like. Preferably, the diorganosiloxane units constituting the diorganopolysiloxane molecules are all dimethyl siloxane units or mostly dimethyl siloxane units with some of other types of diorganosiloxane units each having a phenyl group, vinyl group, 3,3,3-trifluoropropyl group and the like. The diorganopolysiloxane as the component (a) should have an average degree of polymerization of at least 100 or, preferably, at least 500 in order that the cured silicone rubber article prepared from the composition may have good mechanical properties.

The component (b) is a powder of a cured silicone rubber which is compounded with an object to improve the moldability of the composition and electroconductivity and rubbery elasticity of the cured silicone rubber article. Characteristically, the particles of this silicone rubber powder each have a spherical configuration as defined by the sphericity of at least 0.8. The sphericity implied here is a value given by the ratio of (the diameter of a circle having an area equal to a projection of the particle):(the diameter of the smallest circumscribed circle to the projection of the particle) according to the teaching by H. Wadell in J. Geol., volume 40, page 443 (1932) and volume 41, page 310 (1933).

The cured silicone rubber powder as the component (b) should have an average particle diameter in the range from 0.1 to 100 μm. When the average particle diameter is too small, sufficient improvements as desired can hardly be obtained by the admixture thereof if not to mention the difficulty in the preparation of such a fine powder. When the powder is too coarse, on the other hand, certain adverse influences are caused on the mechanical properties of the cured silicone rubber article.

The type of the silicone rubber of which the spherical particles of the component (b) are formed is not particularly limitative. Such a silicone rubber powder can be prepared according to a known method. For example, Japanese Patent Kokai 59-96122 discloses a method according to which a organopolysiloxane composition curable into a silicone rubber is cured in a spray drier at a temperature of 230° to 300° C. Alternatively, Japanese Patent Kokai 62-257939 discloses a method for the preparation of spherical silicone rubber particles, which can be used in the present invention advantageously, according to which a curable organopolysiloxane composition such as a so-called addition-curable composition comprising a vinyl-containing organopolysiloxane and an organohydrogenpolysiloxane as a crosslinking agent is emulsified into emulsion particles having a diameter of 20 μm or smaller by using a surface active agent in an aqueous medium containing a surface active agent and the emulsion is spray-dried either after curing of the organopolysiloxane composition or as such so as to cure the composition during the process of spray-drying. It is optional that the silicone rubber particles are subjected to a surface treatment with an appropriate organosilane or organopolysiloxane compound either during the preparation process thereof or before compounding with the other components in the inventive composition with an object to enhance the affinity thereof with the other components.

The amount of the component (b) relative to the component (a) can be selected from a wide range. For example, the weight ratio of the component (a) to the component (b) is in the range from 95:5 to 50:50 or, preferably, from 90:10 to 60:40. When the amount of the component (b) is too small, the desired improvement thereby can be obtained only insufficiently. When the amount thereof is too large, on the other hand, certain adverse influences may be caused in the mechanical properties of the cured silicone rubber article.

The component (c) in the inventive silicone rubber composition is a carbon black which serves to impart electroconductivity to the composition. The type of the carbon black is not particularly limitative and products of various grades conventionally used in electroconductive rubbers can be used satisfactorily including acetylene blacks, conductive furnace blacks (CF), super-conductive furnace blacks (SCF), extra-conductive furnace blacks (XCF), conductive channel blacks (CC), furnace blacks and channel blacks after a heat treatment at a high temperature of about 1500° C., and so on. Various commercial products are available and can be used as such including, for example, Denka Acetylene Black manufactured by Denki Kagaku Kogyo Co. and Shawnigan Acetylene Black manufactured by Shawnigan Chemical Co. as the examples of acetylene blacks, Continex CF manufactured by Continental Carbon Co. and Vulcan C manufactured by Cabot Corp. as the examples of conductive furnace blacks, Continex SCF manufactured by Continental Carbon Co. and Vulcan SC manufactured by Cabot Corp. as the examples of super-conductive furnace blacks, Asahi HS-500 manufactured by Asahi Carbon Co. and Vulcan XC-72 manufactured by Cabot Corp. as the examples of extra-conductive furnace blacks and Kohlax L manufactured by DEGUSSA Co. as the example of conductive channel blacks. Ketjen Black EC and Ketjen Black EC-600JD manufactured by Ketjen Black International Co. belonging to the class of furnace blacks can also be used satisfactorily. Among the above named commercial products, those of the acetylene black type are preferred in respect of the very low content of impurities and high electroconductivity-imparting power as a consequence of the well-developed secondary structure of the primary particles. Furnace blacks having a large specific surface area are also satisfactory.

The amount of the carbon black as the component (c) in the inventive composition naturally depends on the desired electroconductivity of the silicone rubber. It is usually in the range from 5 to 100 parts by weight or, preferably, from 10 to 70 parts by weight per 100 parts by weight of the total amount of the components (a) and (b). When the amount of the carbon black is too small, the silicone rubber cannot be imparted with a high electroconductivity as desired as a matter of course. When the amount thereof is too large, on the other hand, difficulties are encountered in the compounding and molding works of the composition and the cured rubber article may be poor in the mechanical properties.

The curing agent as the component (d) in the inventive composition is not particularly limitative including any of conventional ones used in silicone rubber compositions by the free-radical reaction, hydrosilation reaction, condensation reaction and the like. The free-radical type curing agent is typically an organic peroxide exemplified by alkyl peroxides, e.g., di-tert-butyl peroxide and 2,5-dimethyl-2,5-di(tertbutylperoxy) hexane, and aralkyl peroxides, e.g., dicumyl peroxide. The mechanism of curing by the reaction of hydrosilation is applicable when the diorganopolysiloxane as the component (a) has at least two vinyl groups bonded to the silicon atoms in a molecule. The curing agent in the curing reaction by hydrosilation is a combination of an organohydrogenpolysiloxane and a platinum compound as a catalyst. The mechanism of curing by the condensation reaction is applicable when the diorganopolysiloxane as the component (a) has at least two functional groups susceptible to the condensation reaction, e.g., alkoxy groups, in a molecule. The curing agent by the condensation reaction is a combination of a polyfunctional alkoxy silane or siloxane compound and a condensation catalyst such as a metal salt of an organic acid. The amount of the curing agent in the inventive composition can be the same as in conventional conductive silicone rubber compositions.

It is optional that the inventive composition is further admixed with various kinds of known additives conventionally used in silicone rubber compositions including reinforcing siliceous fillers, e.g., silica hydrogels and silica aerogels, non-reinforcing fillers, e.g., clay, calcium carbonate, diatomaceous earth and titanium dioxide, low-molecular siloxane esters and silanols, e.g., diphenyl silane diol, as a dispersing aid, heat-resistance improvers, e.g., iron oxides, ceric oxide and iron octoate, various kinds of carbon-functional organosilanes to improve adhesion or workability of the composition, flame retardants, e.g. platinum compounds, and so on each in a limited amount.

The conductive silicone rubber composition of the invention can be prepared by uniformly blending the above described essential and optional ingredients in a suitable rubber-compounding machine such as roller mills, kneaders, Banbury mixers and the like. A preferable procedure is that the components (a), (b) and (c) are first blended to give a compound to which the curing agent as the component (d) and other optional ingredients are added and further uniformly blended.

In the following, the electroconductive silicone rubber composition of the present invention is described in more detail by way of examples, in which the term of "parts" always refers to "parts by weight".

EXAMPLE 1

Rubber compounds were prepared each by uniformly blending, on a two-roller mill, a gum-like diorganopolysiloxane, referred to as the polysiloxane hereinbelow, having an average degree of polymerization of about 8000 and composed of 99.85% by moles of dimethyl siloxane units $(CH_3)_2SiO$ and 0.15% by moles of methyl vinyl siloxane units $(CH_3)$ $(CH_2=CH)$ SiO, a cured silicone rubber powder of spherical particles, referred to as the rubber powder hereinbelow, having a particle diameter of 3 to 15 $\mu$m and sphericity of 0.95 (X-52-594, a product by Shin-Etsu Chemical Co.) and an acetylene black, referred to as the carbon black hereinbelow, each in an amount indicated in Table 1 below. Thereafter, each compound was further admixed with 2,5-dimethyl-2,5-di(tert-butylperoxy) hexane, referred to as the peroxide hereinbelow, in an amount also indicated in Table 1 to give six curable organopolysiloxane compositions I to VI, of which the composition VI was for comparative purpose with omission of the silicone rubber powder.

The organopolysiloxane compositions I to VI prepared in the above described manner were each compression-molded at 165° C. for 10 minutes under a pressure of 30 kg/cm$^2$ into cured rubber sheets having a thickness of 1 mm or 2 mm which were subjected to a post-cure treatment by heating at 200° C. for 4 hours. These cured silicone rubber sheets were subjected to the measurements of the mechanical properties and volume resistivity to give the results shown in Table 1.

TABLE 1

| Example No. | 1 | | | | | | 2 | | |
|---|---|---|---|---|---|---|---|---|---|
| Composition No. | I | II | III | IV | V | VI | VII | VIII | IX |
| Polysiloxane, parts | 90 | 80 | 60 | 80 | 65 | 100 | 60 | 60 | 60 |
| Rubber powder, parts | 10 | 20 | 40 | 20 | 35 | 0 | 40 | 40* | 40* |
| Carbon black, parts | 35 | 35 | 35 | 30 | 25 | 35 | 35 | 35 | 35 |
| Peroxide, parts | 1.6 | 1.6 | 1.6 | 1.5 | 1.5 | 1.6 | 1.6 | 1.6 | 1.6 |
| Specific gravity at 25° C. | 1.11 | 1.11 | 1.11 | 1.09 | 1.07 | 1.11 | 1.11 | 1.11 | 1.11 |
| Hardness, JIS | 50 | 52 | 54 | 46 | 45 | 49 | 52 | 50 | 50 |
| Ultimate elongation, % | 380 | 330 | 265 | 365 | 340 | 375 | 240 | 210 | 180 |
| Tensile strength, kg/cm$^2$ | 61 | 60 | 53 | 52 | 51 | 55 | 48 | 42 | 39 |
| Tear strength, JIS A, kg/cm$^2$ | 11 | 10 | 8 | 8 | 8 | 11 | 7 | 6 | 5 |
| Volume resistivity, ohm · cm | 9 | 7 | 6 | 11 | 11 | 11 | 4 | 9 | 8 |

*non-spherical particles

The conductive silicone rubber composition of the invention obtained in the above described manner has good moldability and curability and can be shaped and cured by a known molding method such as compression molding, transfer molding, extrusion molding, injection molding, calendering and the like into articles of various forms having excellent rubber properties inherent in silicone rubbers in general and high electroconductivity useful in the applications in the office machines such as fixing rollers of xerographic copying machines and keyboard coverings of pocketable calculators, electric and electronic instruments such as terminals of computers, transportation machines such as parts of automobiles and the like as well as in the form of a semiconductive rubber part used for antistatic purpose and elimination of static charges by appropriately selecting the amount of the carbon black.

As is clear from the comparison of the composition VI with the compositions I, II and III, replacement of a part of the polysiloxane with the rubber powder has an effect of decreasing the volume resistivity and, from the comparison of the composition VI with the compositions IV and V, the same volume resistivity can be obtained even by decreasing the amount of the carbon black with consequently decreased hardness of the cured rubber sheets.

EXAMPLE 2

An organopolysiloxane composition, referred to as the composition VII hereinbelow, was prepared in just the same formulation as in the composition III in Example 1 excepting replacement of the rubber powder with the same amount of another cured silicone rubber powder of spherical particles having a particle diameter of 50 to 80 μm and sphericity of 0.80.

Another organopolysiloxane composition, referred to as the composition VIII hereinbelow, was prepared for comparative purpose in just the same formulation as in the composition III excepting replacement of the rubber powder of spherical particle configuration with another cured silicone rubber powder having irregular particle configuration prepared in the following manner. Thus, a composition composed of 100 parts of the same diorganopolysiloxane and 0.3 part of the same organic peroxide as used in Example 1 was compression-molded and cured at 165° C. for 10 minutes into a cured sheet which was crushed and pulverized at the temperature of liquid nitrogen into a powder of irregular particle configuration having a breadth of 20 to 50 μm to be used in the above mentioned composition VIII.

A further comparative organopolysiloxane composition, referred to as the composition IX hereinbelow, was prepared in just the same formulation as in the composition VIII except that the crushed and pulverized silicone rubber powder had a particle diameter distribution in the range from 50 to 80 μm.

Each of the compositions VII, VIII and IX was shaped and cured into rubber sheets which were tested in the same manner as in the Example 1 to give the results also shown in Table 1.

What is claimed is:

1. An electroconductive silicone rubber composition which comprises, in admixture:
    (a) a diorganopolysiloxane represented by the average unit formula $$R_n SiO_{(4-n)/2},$$

in which R is a substituted or unsubstituted monovalent hydrocarbon group selected from the group consisting of alkyl, cycloalkyl, alkenyl and aryl wherein each of said groups contains up to 7 carbon atoms and the subscript n is a positive number in the range of from 1.95 to 2.05;
    (b) cured silicone rubber in the form of a powder of which the particles have a spherical configuration with a sphericity of 0.8 to 1 and an average particle diameter in the range from 0.1 to 100 μm;
    (c) carbon black in an amount ranging from 5 to 100 parts by weight per 100 parts by weight of the total amount of components (a) and (b); and
    (d) a curing agent,
    the proportion of the component (a) to component (b) being in the range from 95:5 to 50:50 by weight.

2. The electroconductive silicone rubber composition as claimed in claim 1 wherein the proportion of the component (a) to component (b) is in the range from 90:10 to 60:40 by weight.

3. The electroconductive silicone rubber composition as claimed in claim 1 wherein the curing agent as the component (d) is an organic peroxide.

4. An electroconductive cured silicone rubber article which is shaped and cured body of a silicone rubber composition comprising, in admixture:
    (a) a diorganopolysiloxane represented by the average unit formula $$R_n SiO_{(4-n)/2},$$

in which R is a substituted or unsubstituted monovalent hydrocarbon group selected from the group consisting of alkyl, cycloalkyl, alkenyl and aryl wherein each of said groups contains up to 7 carbon atoms and the subscript n is a positive number in the range of from 1.95 to 2.05;
    (b) cured silicone rubber in the form of a powder of which the particles have a spherical configuration with a sphericity of 0.8 to 1 and an average particle diameter in the range from 0.1 to 100 m;
    (c) carbon black in an amount ranging from 5 to 100 parts by weight per 100 parts by weight of the total amount of components (a) and (b); and
    (d) a curing agent, the proportion of the component (a) to component (b) being in the range from 95:5 to 50:50 by weight.

* * * * *